(12) United States Patent
Siddiqui et al.

(10) Patent No.: US 9,945,586 B2
(45) Date of Patent: Apr. 17, 2018

(54) SOLAR TRACKER

(71) Applicants: Kamran Siddiqui, London (CA);
Hassan Hassan, London (CA)

(72) Inventors: Kamran Siddiqui, London (CA);
Hassan Hassan, London (CA)

(73) Assignee: THE UNIVERSITY OF WESTERN ONTARIO, London, Ontario (CA)

( * ) Notice: Subject to any disclaimer, the term of this patent is extended or adjusted under 35 U.S.C. 154(b) by 720 days.

(21) Appl. No.: 14/346,665

(22) PCT Filed: Sep. 21, 2012

(86) PCT No.: PCT/CA2012/050664
§ 371 (c)(1),
(2) Date: May 15, 2014

(87) PCT Pub. No.: WO2013/040715
PCT Pub. Date: Mar. 28, 2013

(65) Prior Publication Data
US 2014/0230804 A1  Aug. 21, 2014

Related U.S. Application Data

(60) Provisional application No. 61/537,517, filed on Sep. 21, 2011.

(51) Int. Cl.
*F24J 2/38* (2014.01)
*F24J 2/54* (2006.01)

(52) U.S. Cl.
CPC .............. *F24J 2/38* (2013.01); *F24J 2/5417* (2013.01); *F24J 2/5424* (2013.01);
(Continued)

(58) Field of Classification Search
CPC .................. F24J 2/38; F24J 2/5417
(Continued)

(56) References Cited

U.S. PATENT DOCUMENTS 4,107,521 A * 8/1978 Winders ............... F24J 2/38
126/577
4,215,410 A  7/1980 Weslow
(Continued)

FOREIGN PATENT DOCUMENTS

EP  0150228 A1  8/1985
EP  2072933 A2 * 6/2009  ............... F24J 2/38
(Continued)

OTHER PUBLICATIONS

ISA/CA, International Search Report and Written Opinion for PCT/CA2012/050664, dated Jan. 4, 2013.
(Continued)

*Primary Examiner* — Avinash Savani
*Assistant Examiner* — Aaron Heyamoto
(74) *Attorney, Agent, or Firm* — Brion Raffoul (57) ABSTRACT

Methods and systems for use with solar devices. The present invention may be used with solar panels, solar dishes, or any other devices for which an optimal exposure to the sun is desired. The present invention first adjusts an azimuth of the solar device until an optimal solar exposure, from an azimuth point of view, is achieved. Then, an altitude of the solar collector is adjusted until an optimal solar exposure, from an altitude point of view, is achieved. The invention also uses a load compensation mean to alleviate the amount of lifting or braking torque needed from the motor to tilt the solar collector.

16 Claims, 4 Drawing Sheets

(52) U.S. Cl.
CPC .............. *F24J 2002/5462* (2013.01); *F24J 2002/5493* (2013.01); *Y02E 10/47* (2013.01)

(58) Field of Classification Search
USPC ..................................... 126/574, 577, 572
See application file for complete search history.

(56) References Cited

U.S. PATENT DOCUMENTS

| | | | | |
|---|---|---|---|---|
| 4,316,084 | A * | 2/1982 | Stout ............... | G01S 3/7861 126/577 |
| 5,798,517 | A * | 8/1998 | Berger ............... | F24J 2/38 126/573 |
| 5,964,268 | A * | 10/1999 | Carper ............... | E05D 13/1215 16/198 |
| 6,123,067 | A * | 9/2000 | Warrick ............... | F24J 2/38 126/593 |
| 7,692,091 | B2 * | 4/2010 | Altaii ............... | F24J 2/38 126/577 |
| 9,255,725 | B2 * | 2/2016 | Al-Enizi ............... | F24J 2/38 |
| 2007/0062516 | A1 * | 3/2007 | Lasich ............... | F24J 2/12 126/574 |
| 2007/0272234 | A1 * | 11/2007 | Allen ............... | F24J 2/16 126/704 |
| 2008/0302354 | A1 * | 12/2008 | Jones ............... | F24J 2/05 126/578 |
| 2010/0180884 | A1 * | 7/2010 | Oosting ............... | F24J 2/38 126/574 |
| 2011/0108019 | A1 * | 5/2011 | Minick ............... | F24J 2/5424 126/600 |
| 2013/0000693 | A1 * | 1/2013 | Waterhouse ............... | F24J 2/5233 136/246 |

FOREIGN PATENT DOCUMENTS

| | | | |
|---|---|---|---|
| JP | 2007212116 A * | 8/2007 | |
| WO | WO 2010120123 A2 * | 10/2010 | ............... F24J 2/38 |
| WO | WO2010120123 A2 | 10/2010 | |

OTHER PUBLICATIONS

Office Action for Canadian Patent Application No. 2,849,537, dated Dec. 10, 2014.
Office Action for Canadian Patent Application No. 2,849,537, dated Nov. 25, 2015.
Catarius, A et al. "Azimuth-Altitude Dual Axis Solar Tacker". A Master Qualifying Project: Submitted to the Faculty of Worcester Polytechnic Institute in fulfillment of the Degree of Bachelor of Science, Dec. 16, 2010.

* cited by examiner

SOLAR TRACKER

TECHNICAL FIELD

The present invention relates to solar energy. More specifically, the present invention relates to a methods and devices for use with solar energy collection systems.

BACKGROUND OF THE INVENTION

The current boom in green or environmentally friendly technologies has led to renewed interest in solar energy. The fluctuating but invariably high price of oil in recent memory and recent advances in solar energy collection technologies have made it possible for even individuals to supplant their energy supply needs with solar energy. Solar energy farms (known more generically as solar farms) are also increasing in number, some of which are even sending the energy they have collected to the regular electricity utility companies.

One field in which there has not been as much interest or development has been in the efficiency of the solar energy collectors. One would think that it would be useful to have energy efficient solar energy collectors collecting solar energy. Unfortunately, such has not been the case as current solar energy collectors are still using energy inefficient large electric motors.

As is well-known, solar energy systems need to track the sun to maximize their performance. For some solar energy systems which use devices such as parabolic dish, parabolic trough and central tower systems, it is necessary to continuously track the sun throughout the day, while for photovoltaic (PV) cells, it is highly recommended for the PV panels to track the sun for higher efficiency. In the morning at sunrise, the sun has the lowest altitude angle which reaches the maximum at the solar noon and again starts to decrease to the minimum at the sunset. Thus, the solar collector (dish/panel) is at almost vertical position in the morning and slowly moves toward a near horizontal position by the solar noon and then slowly returns to the vertical position by the sunset. As the sun changes its position very slowly, the movement of the solar collector should also be very slow i.e. a movement of a few centimeters every few minutes.

Currently, high power motors are used to move the solar collectors. In some cases actuators have also been used but they are limited by their stroke length. As the solar collector moves from vertical to the horizontal position, the motor has to push against the collector weight. However, as the solar collector moves from the horizontal to vertical position, the weight of the solar collector provides additional force which pushes the solar collector down. In such situations, the motor may have to counterbalance the weight for controlled and precise small movements. Since the motor and the gearbox have to be attached very close to the axis of rotation of the solar collector, significantly large torque forces are required to move the solar collector from vertical towards the horizontal position. As well, large braking torque forces are required when the dish moves from horizontal towards vertical position.

Due to the significant power requirement that the above techniques require, some companies are using light weight materials such as fibreglass for dishes or solar collectors. However, such materials are expensive and also have major issues with durability. In particular, these materials are not ideal for withstanding wind forces. When a receiver is added to a parabolic dish system, the load that a motor has to move is further increased. For such cases, larger motors are required.

All of the above means that larger motors are currently used to counteract and counterbalance the weight of the solar panel/solar dish assembly. Because of the need for small, precise movements needed to track the sun throughout the day, large torque forces are required, necessitating larger energy consumption.

Another issue with current solar energy collection systems relates to the need to track the sun. Current systems use computers and dedicated hardware to continuously track the position of the sun and to continuously adjust the position of the solar panels/solar dishes to obtain the most efficient exposure to the sun. Current computer controlled systems can easily track the sun for any given day once the latitude and longitude of the location of the solar collection system is entered. As can be imagined, such computer controlled systems can be bulky and quite expensive. As well, such systems can be problematic as any errors in the entry of the longitude and latitude of the location of the solar collection system can throw off the computer's calculations, leading to less than optimal exposure to the sun of the solar panel/solar dish.

Based on the above, there is therefore a need for systems and devices that mitigate if not overcome the drawbacks of the prior art. Current systems are energy inefficient when it comes to the motors controlling the tilting of the solar collector and current solar tracking technologies require high precision entries as well as expensive equipment.

SUMMARY OF INVENTION

The present invention provides methods and systems for use with solar collector systems. The present invention may be used with solar panels, solar dishes, or any other devices for which an optimal exposure to the sun is desired. The present invention first adjusts an azimuth of the solar collector until an optimal solar exposure, from an azimuth point of view, is achieved. Then, an altitude of the solar collector is adjusted until an optimal solar exposure, from an altitude point of view, is achieved. The invention also uses a torsional spring system to alleviate the amount of lifting or braking torque needed from the motor to tilt the solar collector.

In a first aspect, the present invention provides a system for tracking the sun to provide solar exposure to a solar collector, the system comprising:
  an altitude motor for adjusting an altitude of the collector;
  an azimuth motor for adjusting an azimuth of the collector;
  a controller for controlling an activation and deactivation of said altitude motor and said azimuth motor;
  an altitude sensor for detecting solar exposure to the collector, said altitude sensor being coupled to said controller;
  an azimuth sensor for detecting solar exposure to the collector, said azimuth sensor being coupled to said controller;
  an altitude switch for reversing a polarity of said altitude motor, said altitude switch being activated when said collector is at a solar noon position;
  an azimuth switch for reversing a polarity of said azimuth motor, said azimuth switch being activated when said collector reaches an extreme azimuth position;
  a torsion spring coupled to a supporting mechanism for said collector, said torsion spring being attached to said supporting mechanism such that said spring partially supports a weight of said collector when said altitude of said collector is being adjusted by said altitude motor;

wherein
said controller activates and deactivates said altitude motor based on readings from said altitude sensor, said altitude motor being deactivated when said altitude sensor detects sufficient solar exposure for said collector; and
said controller activates and deactivates said azimuth motor based on readings from said azimuth sensor, said azimuth motor being deactivated when said azimuth sensor detects sufficient solar exposure for said collector.

In a second aspect, the present invention provides a system for tracking a sun to provide solar exposure to a solar collector, the system comprising:
an altitude motor for adjusting an altitude of the collector;
an azimuth motor for adjusting an azimuth of the collector;
a controller for controlling an activation and deactivation of said altitude motor and said azimuth motor;
an altitude sensor for detecting solar exposure to the collector, said altitude sensor being coupled to said controller;
an azimuth sensor for detecting solar exposure to the collector, said azimuth sensor being coupled to said controller;
an altitude switch for reversing a polarity of said altitude motor, said altitude switch being activated when said collector is at a solar noon position;
an azimuth switch for reversing a polarity of said azimuth motor, said azimuth switch being activated when said collector reaches an extreme azimuth position;
wherein
said controller activates and deactivates said altitude motor based on readings from said altitude sensor, said altitude motor being deactivated when said altitude sensor detects sufficient solar exposure for said collector; and
said controller activates and deactivates said azimuth motor based on readings from said azimuth sensor, said azimuth motor being deactivated when said azimuth sensor detects sufficient solar exposure for said collector.

In a further aspect, the present invention provides a supporting mechanism for tiltably supporting a load, the mechanism comprising:
a main supporting shaft for supporting a mass of said load
a tilting mechanism for tilting said load, said tilting mechanism being coupled to said main supporting shaft, said tilting mechanism comprising:
a tilting motor for tilting said load
a load compensation means for partially supporting said mass of said device such that said motor requires less torque to tilt said load.

BRIEF DESCRIPTION OF THE DRAWINGS

The drawings show features and advantages will become more apparent from a detailed consideration of the invention when taken in conjunction with the drawings in which.

DETAILED DESCRIPTION OF THE INVENTION

In one embodiment, the present invention uses two subsystems to adjust the solar collector's exposure to the sun—an altitude subsystem controls the altitude or the tilt of the collector while an azimuth subsystem controls the azimuth or direction of the collector. Only one subsystem is active at any one time and each subsystem has an associated sensor which determines exposure to the sun. As an example, the azimuth subsystem adjusts azimuth or direction of facing of the collector so that the azimuth sensor senses optimum exposure to the sun. Once this is done, the altitude subsystem activates and adjusts altitude (or tilt) of the collector until the altitude sensor senses optimum exposure to the sun. Based on this, the solar collector will always have optimum exposure to the sun without the need for longitude or latitude calculations. Both the azimuth subsystem and the altitude subsystem and the motors associated with these subsystems are controlled by a controller that receives input from the altitude sensor and the azimuth sensor. Based on the input from these sensors, the controller activates or deactivates one of the motors.

To minimize on the amount of torque or power needed to adjust the tilt of the collector, the present invention uses a torsion spring in conjunction with a motor to adjust the tilt of the collector. The spring stores energy when the collector is being tilted from horizontal to vertical and this stored energy is used when the collector is being tilted from vertical to horizontal. When moving from horizontal to vertical, the spring provides a braking force which alleviates the amount of torque needed from the motor. When moving from vertical to horizontal, the spring provides a lifting torque or lifting force which alleviates the amount of lifting torque needed from the motor to lift the collector.

It should be noted that while the description below relates to a solar collector, the present invention may be used for any type of solar device that needs to track the sun. Thus, solar collectors, solar cells, photovoltaic solar cells, and solar shades may be used in place of the solar collector described below. Multiple instances of the above solar devices may also be used in place of the solar collector.

Figure 1:
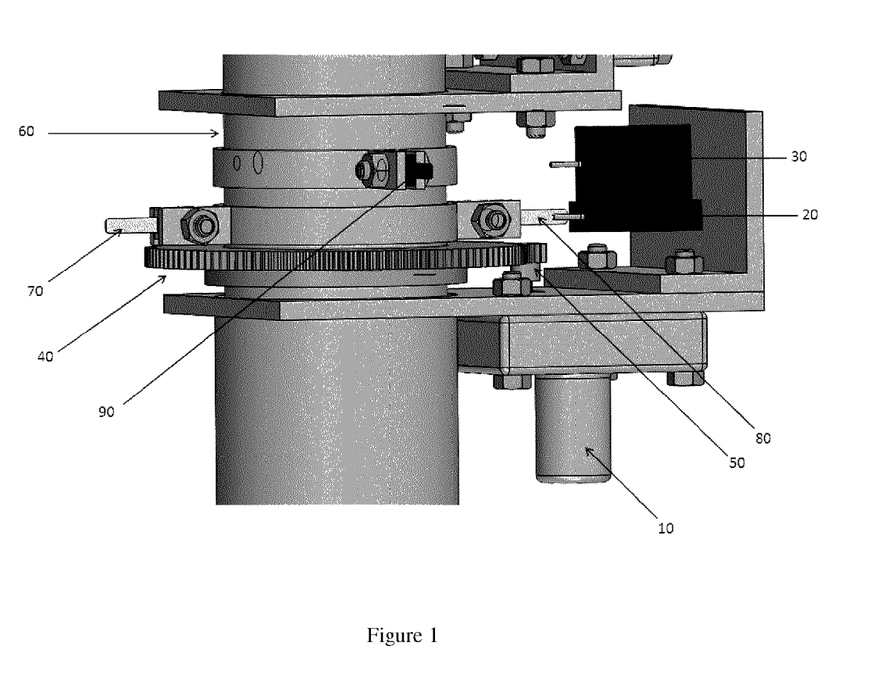
FIG. 1 is an illustration of an azimuth adjustment subsystem including azimuth and altitude switches according to one aspect of the invention.

Referring to FIG. 1, an illustration of the azimuth adjustment subsystem is provided. A 12 VDC motor 10 is present along with an azimuth limit switch 20. An altitude reversing switch 30 is also present. To translate the motion caused by the motor, a driver gear 50 is mounted on the motor and coupled with a follower gear 40 which is mounted on inner post 60. Limit arm 70 for westward azimuth movement and limit arm 80 for eastward azimuth movement and an altitude reversing arm 90 are also illustrated in the Figure. Note that the position of the limit arms with respect to the azimuth angles is adjustable. The azimuth and altitude arms for activating their respective switches use mechanical means for switch activation. Other mechanical, optical, magnetic, or electrical means for switch activation can be used.

Figure 2:
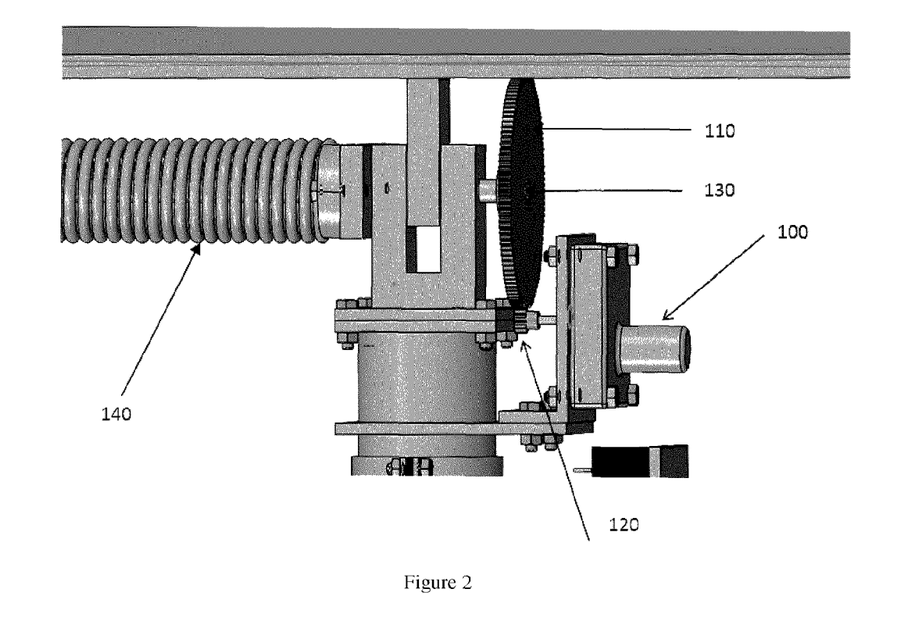
FIG. 2 is an illustration of an altitude adjustment subsystem according to one aspect of the invention.

Referring to FIG. 2, an illustration of the altitude adjustment subsystem is provided. A second 12 VDC motor 100 is present along with a spur gear (follower) 110, a spur gear (driver) 120, and a shaft 130.

The tracker part of the invention operates by first engaging the azimuth adjustment subsystem. When the subsystem starts in the morning, the azimuth motor is engaged. This moves the solar collector (a solar panel or a solar dish or any suitable solar collector may be used) from east to west to a point where the azimuth sensor faces the sun and, maximizes the azimuth sensor's exposure to the sun. In one implementation, once the azimuth sensor detects the sunlight, the azimuth motor is disengaged. It should be noted that other implementations may adjust the azimuth sensor's exposure to sunlight instead of shutting off the azimuth motor once the azimuth sensor senses sunlight. As an example, the azimuth motor may use a preset pattern search to find the optimal azimuth position for the azimuth sensor to receive maximum exposure to sunlight.

Once the azimuth motor has been disengaged, the altitude motor is engaged. The altitude motor adjusts the altitude or tilt angle of the collector until the altitude sensor is exposed to the sun. The altitude motor thus increases the tilt angle of the collector (i.e. tilts the collector upwards) until the altitude sensor senses a suitable amount of sunlight. In one implementation, instead of disengaging the altitude motor when the altitude sensor detects sunlight, the altitude motor is engaged and adjusted, using a preset adjustment pattern, until the optimal amount of sunlight is detected by the altitude sensor. In this implementation, once the optimal amount of sunlight is detected, then the altitude motor is disengaged.

As the sun moves across the sky, the azimuth and altitude positioning of the collector will not be ideal for receiving sunlight. When this occurs, the azimuth and altitude sensors will detect less sunlight due to shadows. Such an occurrence will trip a logic switch or an actual sensor to again engage the azimuth and altitude subsystems to adjust the azimuth and altitude position settings. When this occurs, the azimuth subsystem is first engaged and this adjusts the azimuth positioning of the collector. Once the azimuth position is adjusted to the new setting, the azimuth subsystem is disengaged and the altitude adjustment subsystem is engaged. This adjusts the altitude setting (the tilt of the collector) until the altitude sensor detects a suitable amount of sunlight.

The above adjustment method continues until the collector reaches the solar noon position. When the collector reaches the solar noon position, an altitude switch is activated that reverses the polarity of the altitude motor. As the sun traverses the sky, the collector's position is again adjusted. However, with the polarity of the altitude motor reversed, instead of increasing the altitude (or tilt) of the collector, the altitude is decreased. In one implementation, every time the altitude subsystem is engaged in the afternoon, the altitude is decreased until a sufficient amount of sunlight is detected by the altitude sensor. As with the morning adjustments, the azimuth subsystem is always engaged prior to the altitude subsystem. Once the azimuth adjustments are made, the altitude adjustments are then applied.

While this description determines the azimuth adjustments before the altitude adjustments, the reverse may be implemented with some redesign.

Once sunset is reached, the collector ends the day at its last position. When the sun rises again in the morning, the system is activated by the power supply (a PV (photo voltaic) solar panel is used in one implementation) and the azimuth subsystem is first engaged. This causes the azimuth positioning of the collector to continue in a westward direction. Continuing the adjustment of the azimuth position on a westward direction eventually causes the activation of an azimuth switch that reverses the polarity of the azimuth motor. Thus, instead of continuing on a westward direction, the continued activation of the azimuth motor causes the azimuth of the collector to move in an eastward direction. Continuing the eastward adjustment of the azimuth position, once the noon position is reached, the altitude switch is activated, thereby reversing the polarity of the altitude motor. The azimuth subsystem continues to move the azimuth position of the collector in an eastward direction until the azimuth polarity switch is activated. This polarity switch, once activated, reverses the polarity of the azimuth motor and causes the azimuth subsystem to adjust the azimuth in a westward direction. The azimuth subsystem is then activated and the azimuth position is adjusted in a westward direction until the azimuth sensor detects a sufficient amount of sunlight.

When the azimuth sensor detects a sufficient amount of sunlight, the adjustment of the azimuth position then ends and the azimuth subsystem motor is deactivated. The altitude subsystem is then engaged and the altitude or tilt of the collector is adjusted. Since the polarity of the altitude motor was reversed when the azimuth subsystem passed through the noon position, engaging the altitude motor again increases the altitude or tilt of the controller. Once the altitude sensor detects enough sunlight, the altitude motor is then disengaged. Both the altitude and azimuth subsystems then operate as above and periodically adjust the azimuth and altitude position of the controller to maximize the controller's exposure to the sun.

It should be noted that a different power supply other than the PV solar panel may be used. Any power supply that turns on when the sun appears and turns off when the sun disappears may be used in place of the PV solar panel. In one implementation, the PV solar panel was replaced by a low voltage power source. If the PV solar panel is used, and if the invention is deployed in the northern hemisphere, it is preferable that the solar panel have a fixed southward-facing orientation. For a southern hemisphere deployment of the invention, the orientation may be implementation dependent.

It should also be noted that the azimuth and altitude sensors may be photovoltaic cells or any suitable photo sensor. As well, the motors, while illustrated as 12 volt DC motors, may be any suitable motor which produces enough torque to adjust the altitude and/or the azimuth position of the collector. The altitude and azimuth switches are illustrated as physical switches in the figures. However, software switches or software activated switches may also be used in place of physical switches.

To alleviate the torque and force requirements on the altitude motor, a load compensation means may be used. The load compensation means supports part of the weight of the collector or any solar device used with the invention. Since part of the weight of the load is supported by the load compensation means, the altitude motor does not need to generate as much torque to move the solar device.

Figure 3A:
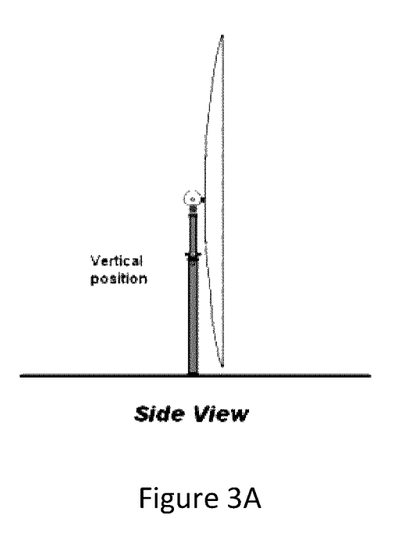
FIG. 3A is a side view of a solar collector in a vertical position.
Figure 3B:
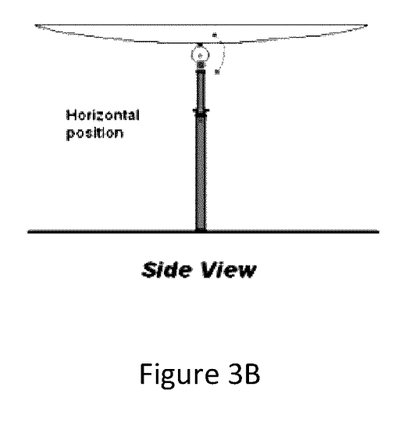
FIG. 3B is a side view of a solar collector in a horizontal position.
Figure 3C:
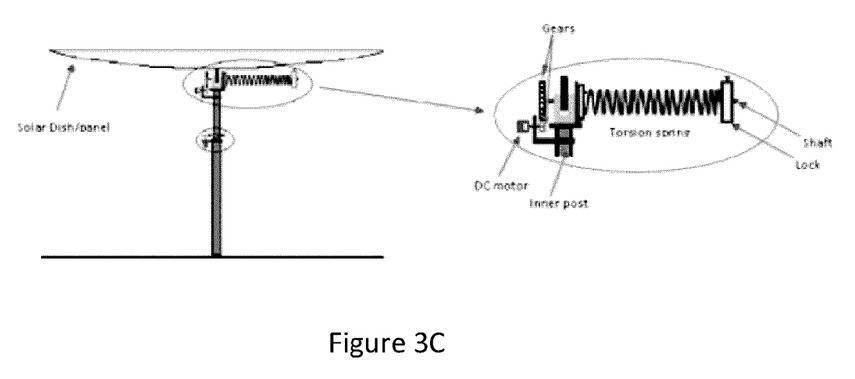
FIG. 3C is a side view of a solar collector using a torsion spring to assist an altitude motor in adjusting an altitude or tilt of the collector.

In one embodiment, the load compensation means, as can be seen from FIG. 2, is a torsion spring 140 coupled to the supporting mechanism for the collector. The spring is attached to a shaft that is parallel to a longitudinal axis of the collector such that the spring stores mechanical energy due to the increased torsion (or winding) as the collector moves from a horizontal to a vertical position. The shaft and the spring rotate with the rotation of the collector as the collector's azimuth bearing changes. The advantages of this spring and its function are best described with relation to FIG. 3. From the side view in FIG. 3A, a collector (in this case a dish collector) is illustrated. When the collector is being tilted up (i.e. when the altitude is being increased or the collector is moving from the vertical (FIG. 3A) towards the horizontal (FIG. 3B)), the spring pushes against the weight of the collector by releasing the energy as the spring unwinds (see FIG. 3C). When the collector moves from the horizontal to the vertical, the spring stores energy as it is wound. The spring thereby provides braking torque when the collector moves from horizontal to vertical. When the collector moves from vertical to horizontal, the spring provides a lifting torque such that the altitude motor does not have to carry the full weight of the collector. Less power is thus required by the altitude motor.

The torsion spring illustrated in the figures may be tuned or adjusted to support more or less weight as required. By adjusting by how much the spring is initially twisted (or wound), the weight supported by the torsion spring can be adjusted. Thus, if the collector is replaced with a lighter or a heavier solar device, the spring can be adjusted to support that lighter or heavier weight.

In one implementation, the torsion spring was able to support 60-75% of the collector's weight, leaving only 25-40% of the weight to be carried and moved by the altitude motor.

The load compensation means may take the form of single or multiple springs, with multiple springs being coupled in series or parallel configurations or the multiple springs can be coupled in a combination of series and parallel configurations. These springs can also be adjusted to support lighter or heavier loads as the implementation may require.

It should be noted that slew drives may be used in place of the various gearing mechanisms described above. The gearing mechanism used to adjust the altitude or tilt angle of the solar device may be replaced by a single-axis slew drive with the slew drive being powered by the altitude motor. In another configuration, a single-axis slew drive and a suitably matching motor may be used in place of the gearing mechanism and altitude motor described above for the altitude subsystem.

Similarly, the gearing mechanism used in the azimuth subsystem to adjust the solar device's azimuth position may be replaced by a single-axis slew drive with the slew drive being driven by the azimuth motor. As with the altitude subsystem, the gearing mechanism and the azimuth motor may be replaced as a whole with a single-axis slew drive and a suitable matching or mated drive motor.

A further variant of the above may use a dual-axis slew drive to replace the gearing mechanisms used in both the altitude and azimuth subsystems. As well, both the altitude motor and the azimuth motor may be replaced, along with the relevant gearing mechanisms, with a dual-axis slew drive and suitable drive motors.

In a further aspect, this document discloses a system for tracking a sun to provide solar exposure to a solar device, the system comprising:
an altitude motor for adjusting an altitude of the device;
an azimuth motor for adjusting an azimuth of the device;
a controller for controlling an activation and deactivation of said altitude motor and said azimuth motor;
an altitude sensor for detecting solar exposure to the device, said altitude sensor being coupled to said controller;
an azimuth sensor for detecting solar exposure to the device, said azimuth sensor being coupled to said controller;
an altitude switch for reversing a polarity of said altitude motor, said altitude switch being activated when said device is at a solar noon position;
an azimuth switch for reversing a polarity of said azimuth motor, said azimuth switch being activated when said device reaches an extreme azimuth position;
a main supporting shaft for supporting said device;
at least one torsion spring coupled to a supporting mechanism for said device, said at least one torsion spring being attached to said supporting mechanism such that said at least one torsion spring partially supports a weight of said device when said altitude of said device is being adjusted by said altitude motor, said at least one torsion spring being attached to a shaft perpendicular to a longitudinal axis of said main supporting shaft;
wherein
said controller activates and deactivates said altitude motor based on readings from said altitude sensor, said altitude motor being deactivated when said altitude sensor detects sufficient solar exposure for said device;
said at least one torsion spring provides a braking force which alleviates an amount of torque needed from said altitude motor when said altitude of said device is being adjusted by said altitude motor, said at least one torsion spring stores energy as said device transitions from a horizontal position to a vertical position and said at least one torsion spring releases energy as said device transitions from said vertical position to said horizontal position; and
said controller activates and deactivates said azimuth motor based on readings from said azimuth sensor, said azimuth motor being deactivated when said azimuth sensor detects sufficient solar exposure for said device.

In a further aspect, this document discloses a system for tracking a sun to provide solar exposure to a solar device, the system comprising:
an altitude motor for adjusting an altitude of the device;
an azimuth motor for adjusting an azimuth of the device;
a controller for controlling an activation and deactivation of said altitude motor and said azimuth motor;
an altitude sensor for detecting solar exposure to the device, said altitude sensor being coupled to said controller;
an azimuth sensor for detecting solar exposure to the device, said azimuth sensor being coupled to said controller;
an altitude switch for reversing a polarity of said altitude motor, said altitude switch being activated when said device is at a solar noon position;
an azimuth switch for reversing a polarity of said azimuth motor, said azimuth switch being activated when said device reaches an extreme azimuth position;
wherein
said controller activates and deactivates said altitude motor based on readings from said altitude sensor, said altitude motor being deactivated when said altitude sensor detects sufficient solar exposure for said device;
said controller activates and deactivates said azimuth motor based on readings from said azimuth sensor, said azimuth motor being deactivated when said azimuth sensor detects sufficient solar exposure for said device;
and wherein said system further comprises:
a load compensation means coupled to a supporting mechanism for said device, said load compensation means being attached to said supporting mechanism such that said load compensation means partially supports a weight of said device when said altitude of said device is being adjusted by said altitude motor, said load compensation means providing a braking force which alleviates an amount of torque needed from said altitude motor when said altitude of said device is being adjusted by said altitude motor, said load compensation means being at least one of:
  at least one torsion spring;
  at least one torsion bar; and
  a plurality of springs;
wherein said load compensation means is attached to a shaft that is perpendicular to a longitudinal axis of a main supporting shaft of said system and
wherein:
said load compensation means stores energy as said device transitions from a horizontal position to a vertical position;
said load compensation means releases energy as said device transitions from a vertical position to a horizontal position.

The gearing mechanism used for the altitude subsystem and/or azimuth subsystem noted above may be a combination of any type of gears.

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A system for tracking a sun to provide solar exposure to a solar device, the system comprising:
   an altitude motor for adjusting an altitude of the device;
   an azimuth motor for adjusting an azimuth of the device;
   a controller for controlling an activation and deactivation of said altitude motor and said azimuth motor;
   an altitude sensor for detecting solar exposure to the device, said altitude sensor being coupled to said controller;
   an azimuth sensor for detecting solar exposure to the device, said azimuth sensor being coupled to said controller;
   an altitude switch for reversing a polarity of said altitude motor, said altitude switch being activated when said device is at a solar noon position;
   an azimuth switch for reversing a polarity of said azimuth motor, said azimuth switch being activated when said device reaches an extreme azimuth position;
   a main supporting shaft for supporting said device;
   at least one torsion spring coupled to a supporting mechanism for said device, said at least one torsion spring being attached to said supporting mechanism such that said at least one torsion spring partially supports a weight of said device when said altitude of said device is being adjusted by said altitude motor, said at least one torsion spring being attached to a shaft perpendicular to a longitudinal axis of said main supporting shaft;
   wherein
     said controller activates and deactivates said altitude motor based on readings from said altitude sensor, said altitude motor being deactivated when said altitude sensor detects sufficient solar exposure for said device;
     said at least one torsion spring provides a braking force which alleviates an amount of torque needed from said altitude motor when said altitude of said device is being adjusted by said altitude motor, said at least one torsion spring stores energy as said device transitions from a horizontal position to a vertical position and said at least one torsion spring releases energy as said device transitions from said vertical position to said horizontal position; and
     said controller activates and deactivates said azimuth motor based on readings from said azimuth sensor, said azimuth motor being deactivated when said azimuth sensor detects sufficient solar exposure for said device.

2. A system according to claim 1 wherein said extreme azimuth position is a westernmost azimuth position for said device.

3. A system according to claim 1 wherein at least one of said azimuth switch and altitude switch is a software-activated switch.

4. A system according to claim 1 wherein at least one of said azimuth sensor and said altitude sensor is a photo sensor.

5. A system according to claim 1 wherein said solar device comprises at least one solar collector.

6. A system according to claim 1 wherein said solar device comprises at least one photo sensor.

7. A system according to claim 1 wherein said solar device comprises at least one solar shade.

8. A system according to claim 1 wherein said at least one torsion spring is adjustable to compensate for heavier solar devices.

9. A system according to claim 1 further comprising a single-axis slew drive, said single-axis slew drive being for adjusting either said altitude or said azimuth of said device.

10. A system according to claim 1 further comprising a dual-axis slew drive, said dual-axis slew drive being for adjusting at least one of said altitude or said azimuth of said device.

11. A system for tracking a sun to provide solar exposure to a solar device, the system comprising:
    an altitude motor for adjusting an altitude of the device;
    an azimuth motor for adjusting an azimuth of the device;
    a controller for controlling an activation and deactivation of said altitude motor and said azimuth motor;
    an altitude sensor for detecting solar exposure to the device, said altitude sensor being coupled to said controller;
    an azimuth sensor for detecting solar exposure to the device, said azimuth sensor being coupled to said controller;
    an altitude switch for reversing a polarity of said altitude motor, said altitude switch being activated when said device is at a solar noon position;
    an azimuth switch for reversing a polarity of said azimuth motor, said azimuth switch being activated when said device reaches an extreme azimuth position;
    wherein
      said controller activates and deactivates said altitude motor based on readings from said altitude sensor, said altitude motor being deactivated when said altitude sensor detects sufficient solar exposure for said device;
      said controller activates and deactivates said azimuth motor based on readings from said azimuth sensor, said azimuth motor being deactivated when said azimuth sensor detects sufficient solar exposure for said device;
    and wherein said system further comprises:
      a load compensation means coupled to a supporting mechanism for said device, said load compensation means being attached to said supporting mechanism such that said load compensation means partially supports a weight of said device when said altitude of said device is being adjusted by said altitude motor, said load compensation means providing a braking force which alleviates an amount of torque needed from said altitude motor when said altitude of said device is being adjusted by said altitude motor, said load compensation means being at least one of:
at least one torsion spring;
at least one torsion bar; and
a plurality of springs;
wherein said load compensation means is attached to a shaft that is perpendicular to a longitudinal axis of a main supporting shaft of said system and
wherein:
said load compensation means stores energy as said device transitions from a horizontal position to a vertical position;
said load compensation means releases energy as said device transitions from a vertical position to a horizontal position.

12. A system according to claim 11 wherein said load compensation means comprises a plurality of torsion springs arranged in a series configuration.

13. A system according to claim 11 wherein said load compensation means comprises a plurality of torsion springs arranged in a parallel configuration.

14. A system according to claim 11 wherein said load compensation means comprises a plurality of torsion springs arranged in a combination of series and parallel configurations.

15. A system according to claim 11 further comprising a single-axis slew drive, said single-axis slew drive being for adjusting either said altitude or said azimuth of said device.

16. A system according to claim 11 further comprising a dual-axis slew drive, said dual-axis slew drive being for adjusting at least one of said altitude or said azimuth of said device.

* * * * *